United States Patent
Dong et al.

(10) Patent No.: US 11,614,633 B2
(45) Date of Patent: Mar. 28, 2023

(54) OPTICAL MODULE ASSEMBLY DEVICE

(71) Applicant: GOER OPTICAL TECHNOLOGY CO., LTD., Shandong (CN)

(72) Inventors: Nanjing Dong, Weifang (CN); Debo Sun, Weifang (CN)

(73) Assignee: GOER OPTICAL TECHNOLOGY CO., LTD., Weifang (CN)

(*) Notice: Subject to any disclaimer, the term of this patent is extended or adjusted under 35 U.S.C. 154(b) by 437 days.

(21) Appl. No.: 16/646,984

(22) PCT Filed: Sep. 6, 2018

(86) PCT No.: PCT/CN2018/104385
§ 371 (c)(1),
(2) Date: Mar. 12, 2020

(87) PCT Pub. No.: WO2019/076158
PCT Pub. Date: Apr. 25, 2019

(65) Prior Publication Data
US 2020/0264444 A1    Aug. 20, 2020

(30) Foreign Application Priority Data
Oct. 17, 2017   (CN) .......................... 201710964909.2

(51) Int. Cl.
G02B 27/62    (2006.01)
G02B 27/09    (2006.01)
G02B 27/12    (2006.01)

(52) U.S. Cl.
CPC ......... *G02B 27/62* (2013.01); *G02B 27/0977* (2013.01); *G02B 27/123* (2013.01)

(58) Field of Classification Search
CPC ... G02B 27/62; G02B 27/0977; G02B 27/123
(Continued)

(56) References Cited

U.S. PATENT DOCUMENTS 4,615,093 A * 10/1986 Tews .................... H05K 13/046
                                                    700/192
6,327,093 B1* 12/2001 Nakanishi ............ G02B 27/149
                                                    349/9
(Continued)

FOREIGN PATENT DOCUMENTS

CN      201184923 Y     1/2009
CN      104180969 A    12/2014
(Continued)

OTHER PUBLICATIONS

CN Office Action in Application No. 201911017826.8 dated Jun. 29, 2022.
(Continued)

*Primary Examiner* — Joseph P Martinez
*Assistant Examiner* — Mitchell T Oestreich
(74) *Attorney, Agent, or Firm* — Maschoff Brennan

(57) ABSTRACT

Provided is an optical module assembly device, including: a fixing member for fixing an optical member to be assembled, a power supply component for supplying power to the optical member to be assembled, and an alignment mechanism for placing a lens to be assembled at the specified position; a beam splitting prism with an in-light surface close to the optical member to be assembled, a first image acquisition device close to a first out-light surface of the beam splitting prism and coaxial with the first out-light surface, and a second image acquisition device close to a second out-light surface of the beam splitting prism and coaxial with the second out-light surface; and a controller configured to control the alignment mechanism to adjust a position of the lens to be assembled according to the images captured by the first image acquisition device and the second image acquisition device.

15 Claims, 3 Drawing Sheets

(58) Field of Classification Search
USPC .......................................................... 264/1.1
See application file for complete search history.

(56) References Cited

U.S. PATENT DOCUMENTS

| | | |
|---|---|---|
| 10,345,822 B1 | 7/2019 | Parchami et al. |
| 2019/0080470 A1 | 3/2019 | Zhu et al. |
| 2019/0278292 A1 | 9/2019 | Levinson et al. |

FOREIGN PATENT DOCUMENTS

| | | |
|---|---|---|
| CN | 105721753 A | 6/2016 |
| CN | 106238286 A | 12/2016 |
| CN | 107589552 A | 1/2018 |
| CN | 207663157 U | 7/2018 |
| CN | 109724603 A | 5/2019 |
| EP | 3508937 A1 | 7/2019 |
| JP | 2004177334 A * | 6/2004 |
| WO | 85/02088 A1 | 5/1985 |
| WO | 2018006082 A2 | 1/2018 |
| WO | 2018006082 A3 | 1/2018 |

OTHER PUBLICATIONS

European Search Report in Application No. 20879071.7 dated Oct. 18, 2022.
CN Office Action in Application No. 201710964909.2 dated Oct. 8, 2022.

* cited by examiner

OPTICAL MODULE ASSEMBLY DEVICE

CROSS-REFERENCE TO RELATED APPLICATIONS

The present disclosure refers to Chinese Patent Application No. 201710964909.2, filed on Oct. 17, 2017, entitled "Optical Module Assembly Device", which is hereby incorporated by reference in its entirety.

TECHNICAL FIELD

The present disclosure relates to the field of assembly technology, and in particular to an optical module assembly device.

BACKGROUND

Nowadays, there are more and more optical modules with independent functions in the market to meet diversified market demands. These optical modules can be embedded in other devices to perform their functions, such as camera modules, miniature projection modules, LED (Light Emitting Diode, light emitting diode) optical modules, VR (Virtual Reality)/AR (Augmented Reality) optical modules and so on.

Generally, an optical module is assembled by a plurality of optical elements and other components. For example, the camera module can be assembled by components such as an image sensor, a lens base, a plurality of lenses, and a circuit board. Specifically, the assembly accuracy of the lens plays a decisive role in the optical performance of the optical module.

In the prior art, tooling or manual assembly is usually used to assemble the lenses in the optical module based on the parameters of the lenses and the parameters of other parts. However, there are large errors in these assembly methods, which affect the optical performance of the assembled optical module.

SUMMARY

Various aspects of the present disclosure provide an optical module assembly device, which is used to reduce the assembly tolerance of the optical module and effectively improve the optical performance of the optical module.

The present disclosure provides an optical module assembly device, including:

a fixing member for fixing an optical member to be assembled, a power supply component for supplying power to the optical member to be assembled, and an alignment mechanism for placing a lens to be assembled at a specified position of the optical member to be assembled;

a beam splitting prism with an in-light surface close to the optical member to be assembled, a first image acquisition device close to a first out-light surface of the beam splitting prism and coaxial with the first out-light surface, and a second image acquisition device close to a second out-light surface of the beam splitting prism and coaxial with the second out-light surface; and a controller configured to control the alignment mechanism to adjust a position of the lens to be assembled according to the images captured by the first image acquisition device and the second image acquisition device.

Further optionally, further including: a positive lens provided between the first image acquisition device and the beam splitting prism, and coaxial with the first image acquisition device.

Further optionally, where the positive lens includes an aspheric positive lens.

Further optionally, where the beam splitting prism includes two right-angle prisms bonded by oblique surfaces, and a bonding surface is plated with a semi-transmitted and semi-reflected dielectric film having a transmittance and a reflectance of 1:1.

Further optionally, further including a dispensing mechanism; where the dispensing mechanism includes a second mechanical arm electrically connected to the controller and a UV dispensing syringe fixed on the second mechanical arm; the dispensing mechanism is configured to perform a dispensing operation on the optical member to be assembled according to a dispensing instruction of the controller.

Further optionally, where the dispensing mechanism further includes a third image acquisition device fixed on the second mechanical arm.

Further optionally, where the alignment mechanism is provided with a UV lamp electrically connected to the controller.

Further optionally, where the alignment mechanism includes: a first mechanical arm electrically connected to the controller, and an alignment head provided on the first mechanical arm; where the alignment head includes a vacuum suction head or an adjustable mechanical clamping head.

Further optionally, where the alignment head further includes an integration mechanism; the integration mechanism is connected to the first mechanical arm, and is configured to integrate a plurality of alignment heads on the first mechanical arm.

Further optionally, where each fixing member of a plurality of fixing members is provided with a sensor for detecting whether or not an optical member to be assembled is placed on the each fixing member.

In the present disclosure, when the optical module is assembled, make the optical module to be aligned image, and a beam splitting prism and two sets of image acquisition device are used to obtain images imaged by the optical module to be aligned/or the images of the optical member to be assembled in two different directions respectively, and the controller may determine whether the lens to be assembled is aligned in all three axes according to the imaging results collected by the two sets of image acquisition device, and continuously control the alignment component to drive the lens to be assembled for position adjustment in the case of being not aligned. The above three-axis simultaneous feedback alignment process effectively reduces the assembly tolerance of the entire optical module, improves the assembly accuracy of the optical module, and effectively ensures the optical performance of the optical module.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are some embodiments of the present disclosure. For those of ordinary skill in the art, other drawings can be obtained based on these drawings without paying creative labor.

DETAILED DESCRIPTION OF EXAMPLE EMBODIMENTS

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

It should be noted that, in the following embodiments of the present disclosure, the optical module refers to the completed product after the alignment is completed and is fixed; the optical module to be aligned refers to the optical module during the assembly process, which may be in an unaligned state or in an aligned state; the optical member to be assembled refers to the semi-finished product of the optical module, and the optical module can only be obtained after the lens to be assembled is aligned and assembled at its specified position and is fixed. The above-mentioned concepts mentioned below can be understood with reference to the above explanations, and will not be repeated.

Figure 1A:
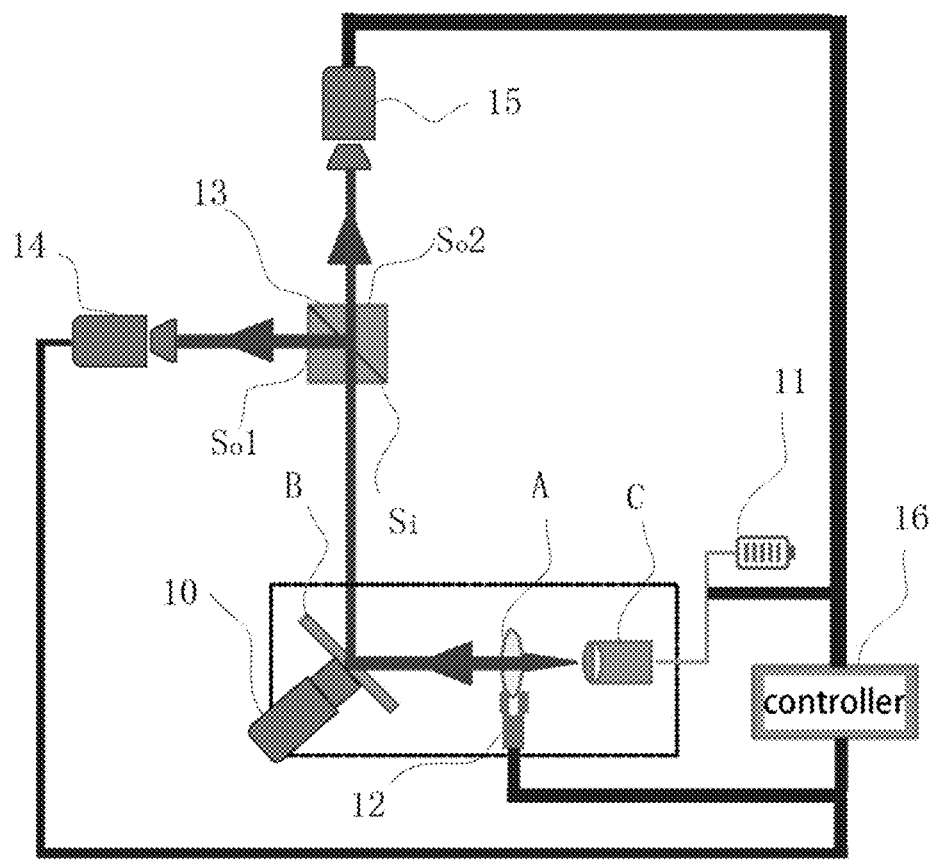
FIG. 1a is a schematic structural diagram of an optical module assembly device according to an embodiment of the present disclosure.

FIG. 1a is a schematic structural diagram of an optical module assembly device according to an embodiment of the present disclosure. In conjunction with FIG. 1a, the device includes:

a fixing member 10 for fixing an optical member to be assembled, a power supply component 11 for supplying power to the optical member to be assembled, and an alignment mechanism 12 for placing a lens to be assembled at a specified position of the optical member to be assembled; a beam splitting prism 13 with an in-light surface $S_i$ close to the optical member to be assembled, a first image acquisition device 14 close to a first out-light surface $S_o1$ of the beam splitting prism 13 and coaxial with the first out-light surface $S_o1$, and a second image acquisition device 15 close to a second out-light surface $S_o2$ of the beam splitting prism 13 and coaxial with the second out-light surface $S_o2$; and a controller 16 configured to control the alignment mechanism 12 to adjust a position of the lens to be assembled according to the images captured by the first image acquisition device 14 and the second image acquisition device 15.

It should be noted that, in the dashed frame of FIG. 1a, except for the marked fixing member 10 and the alignment mechanism 12, A is a schematic diagram of the lens to be assembled, B is a schematic diagram of a reflector included in the optical member to be assembled, and C is a schematic diagram of a light source device inside the optical member to be assembled or an external light source device. Of course, it should be understood that the above-mentioned schematic diagram of the optical path structure including A, B, and C is merely for the convenience of explaining the technical solution of the present disclosure, and it does not limit the essence of the present disclosure. When the internal structure or function of the optical module to be assembled changes, this part of the optical path structure should be changed accordingly, and will not be described again.

In the process of assembling an optical lens, when there is an object-side light source, the object-side light source may be transmitted through the optical member to be assembled and the lens to be assembled. The transmitted light passes through the beam splitting prism 13 and is divided into two beams by the beam splitting surface of the beam splitting prism 13, and the two beams of light respectively propagate in different directions.

Optionally, in the present embodiment, the beam splitting prism 13 may be formed by bonding oblique surfaces of two right-angle prisms, and a bonding surface is plated with a semi-transmitted and semi-reflected dielectric film having a transmittance and a reflectance of 1:1. Further, the light incident from the in-light surface $S_i$ of the beam splitting prism 13 may be divided into two light beams with similar intensities and perpendicular directions through the semi-transmitted and semi-reflected dielectric film. The light beam reflected by the semi-transmitted and semi-reflected dielectric film may be transmitted through the first out-light surface $S_o1$, and the light beam transmitted by the semi-transmitted and semi-reflected dielectric film may be transmitted through the second out-light surface $S_o2$. Further, the first image acquisition device 14 and the second image acquisition device 15 may respectively capture images in the range of their viewing angles.

It should be understood that, in order to ensure the optical performance of the optical module, during the assembling process, the alignment of the optical lens to be assembled includes the optical lens to be assembled is aligned in XYZ three axes of the optical component to be assembled, respectively. Specifically, the Z-axis coordinate may represent a distance between the optical lens to be assembled and a center point of the optical member to be assembled, and the X-axis and Y-axis coordinates may represent an up-down offset and a left-right offset of the optical lens to be assembled relative to the optical member to be assembled.

Figure 1B:
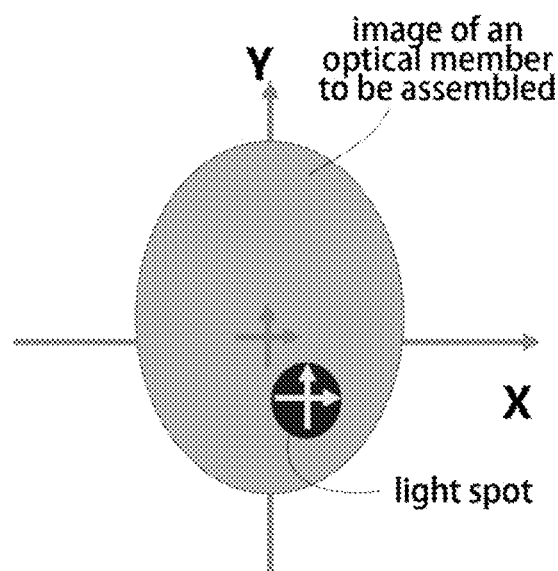
FIG. 1b is a schematic diagram of an image including a light spot and an optical member to be assembled according to an embodiment of the present disclosure.

In an achievable implementation manner, the controller 16 may analyze the upper, lower, left, and right positions of the optical lens to be assembled relative to the optical member to be assembled according to an image including the imaging light spot and the optical member to be assembled captured by the first image acquisition device 14. FIG. 1b illustrates an image captured by the first image acquisition device 14 including the optical member to be assembled and a light spot. In the XY plane shown in FIG. 1b, the light spot is at the lower right of the optical member to be assembled.

In an achievable implementation manner, the controller 16 may analyze a distance of the optical lens to be assembled with respect to the optical member to be assembled according to the size of the light spot displayed by the image including the imaging light spot captured by the second image acquisition device 15.

After determining the distance between the upper, lower, left, right, and the center point of the optical lens to be assembled with respect to the optical member to be assembled, the controller 16 may generate a corresponding alignment instruction, and send the alignment instruction to the alignment mechanism 12 so that the alignment mechanism 12 performs three-axis or six-axis motion to adjust the position of the lens to be assembled.

Optionally, in order to ensure that the first image acquisition device 14 can not only capture the imaging light spot, but also the optical component to be assembled, the distance between the first image acquisition device 14 and the beam splitting prism 13 may be appropriately increased when setting the distance such that the distance meets the needs of the first image acquisition device 14 to capture the optical member to be assembled.

Figure 2:
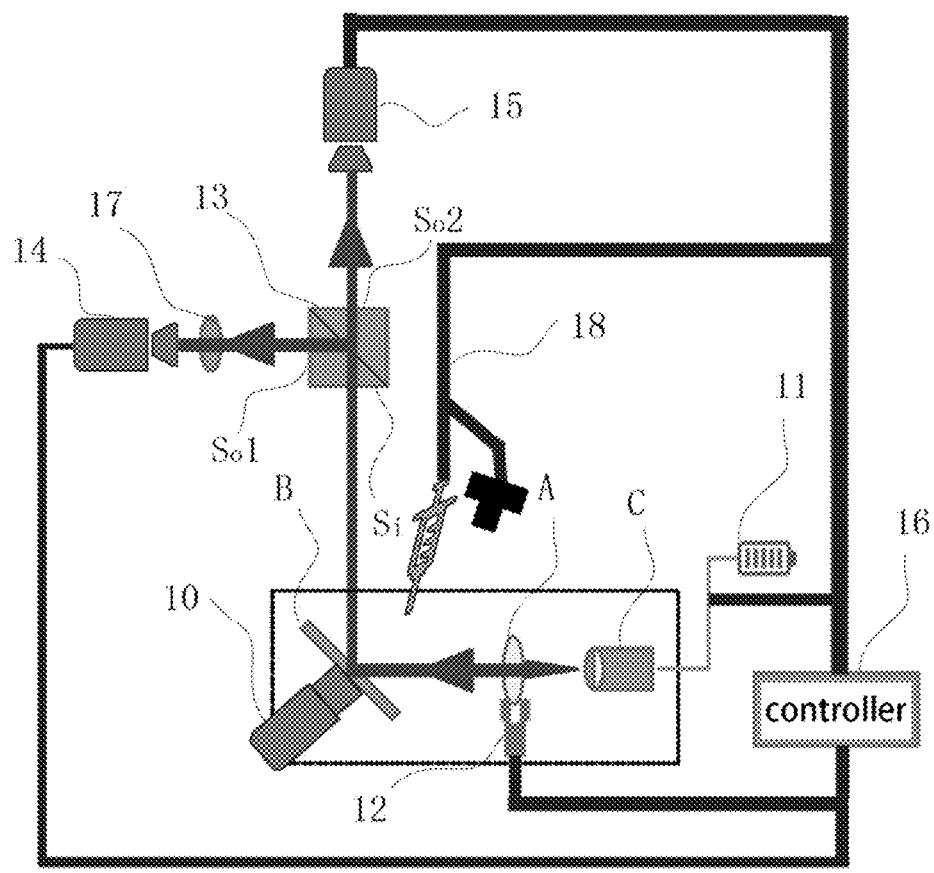
FIG. 2 is a schematic structural diagram of an optical module assembly device according to another embodiment of the present disclosure.

Optionally, as shown in FIG. 2, in the present embodiment, a positive lens 17 may be provided between the first image acquisition device 14 and the beam splitting prism 13, where the positive lens 17 is coaxial with the first image acquisition device 14. Further, the positive lens 17 having a positive power may assist in expanding the field angle of the first image acquisition device 14, thereby reducing the device volume, and further ensuring the shooting quality of the first image acquisition device 14 regarding to the optical component to be assembled. Optionally, the positive lens 17 may be a single lens or a lens group.

In an optional implementation manner, the positive lens 17 may include an aspheric lens. The aspheric lens may make the light spot captured by the first image acquisition device 14 have a smaller spherical aberration, and thus the relative position between the light spot and the optical member to be assembled may be analyzed more accurately.

In the embodiment of the present disclosure, the fixing member 10 may be a vacuum holding member or a size-adjustable clamp. The fixing member 10 may fix the optical member to be assembled thereon, and ensure that the optical member to be assembled is accurately placed at a specified position on a turntable. The optical member to be assembled may be a semi-finished product of the optical module, which may be obtained by assembling the optical component and the lens to be assembled.

Optionally, the alignment mechanism 12 includes a first mechanical arm electrically connected to the controller 16 and an alignment head provided on the first mechanical arm. The alignment head may be a vacuum suction head or an adjustable mechanical clamping head, which is not limited in the present disclosure.

Optionally, in a possible situation, it is necessary to assemble two or more optical lenses into the optical member to be assembled. One achievable way is to assemble one piece at a time, and one achievable way is to assemble a plurality of pieces at the same time. When a plurality of pieces are assembled at the same time, a plurality of alignment heads are needed to hold the lenses to be assembled respectively.

Figure 3A:
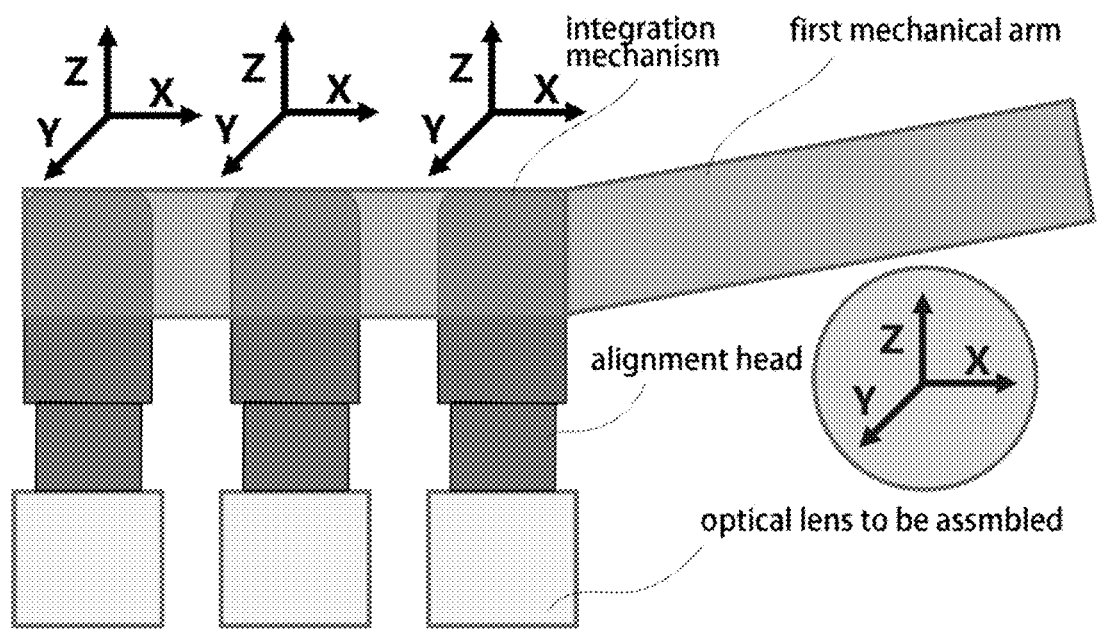
FIG. 3a is a schematic structural diagram of an alignment mechanism 12 according to an embodiment of the present disclosure.
Figure 3B:
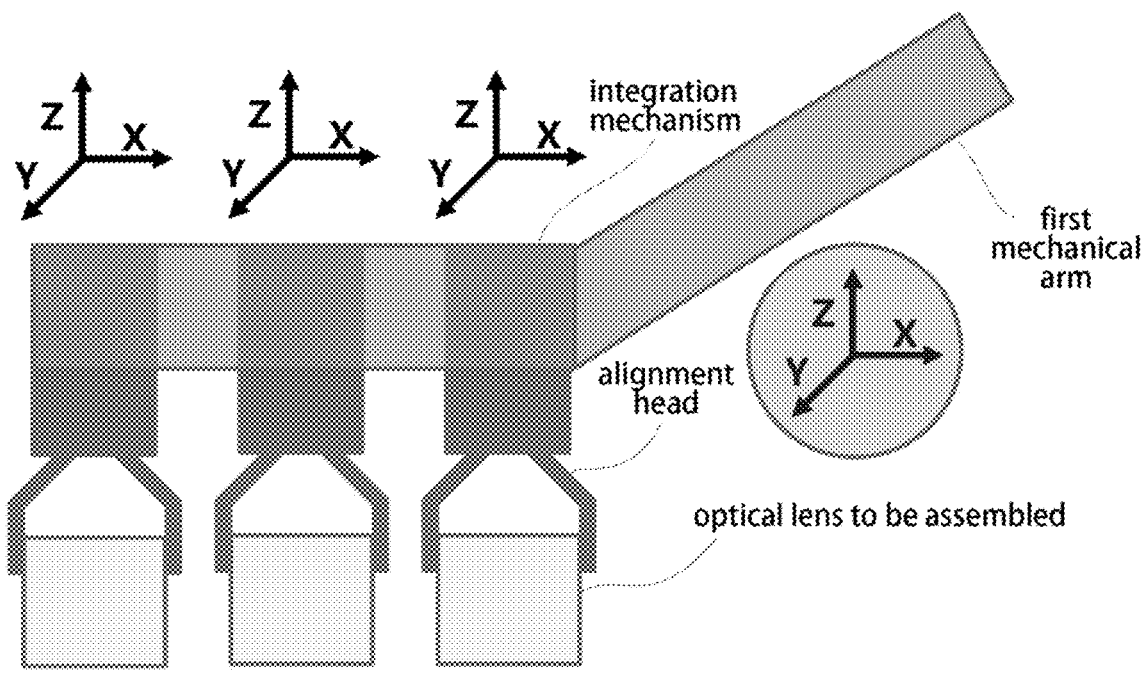
FIG. 3b is another schematic structural diagram of an alignment mechanism 12 according to an embodiment of the present disclosure.

To meet the requirement of assembling a plurality of lenses to be assembled at the same time, as shown in FIG. 3a and FIG. 3b, the alignment mechanism 12 further includes an integration mechanism. The integration mechanism is connected to the first mechanical arm and is used to integrate a plurality of alignment heads on the first mechanical arm. In the above embodiment, the first mechanical arm may perform three-axis motion in the X, Y, and Z directions according to the control instruction of the controller 16, and the plurality alignment heads on the integrated mechanism may also independently perform three-axis motion in the X, Y, and Z directions. The first mechanical arm may move the lens to be assembled from a loading rack to an operating position of the alignment mechanism 12, and the plurality of the alignment heads on the integration mechanism may respectively place the grasped lens to be assembled at its theoretical position. Of course, the first mechanical arm and the plurality of the alignment heads on the integrated mechanism may also perform six-axis motion (X, Y, Z, θX, θY, and θZ) under the control instruction of the controller 16 or even other required multi-axis motion, which is not limited in the embodiment of the present disclosure.

In an optional embodiment, as shown in FIG. 1a and FIG. 2, the present embodiment further includes a dispensing mechanism 18. The dispensing mechanism 18 may perform a dispensing operation on the optical member to be assembled. In the dispensing operation, the dispensing mechanism 18 may apply a specific glue to the optical member to be assembled by applying, potting, or dripping, so that the dispensing portion has a certain viscosity, and then the lens to be assembled is fixed after the lens to be assembled is aligned, and a finished optical module is finally obtained. The dispensing mechanism 18 may perform the dispensing operation before or after the lens to be assembled is aligned, and the order is not limited in the present embodiment.

Figure 4:
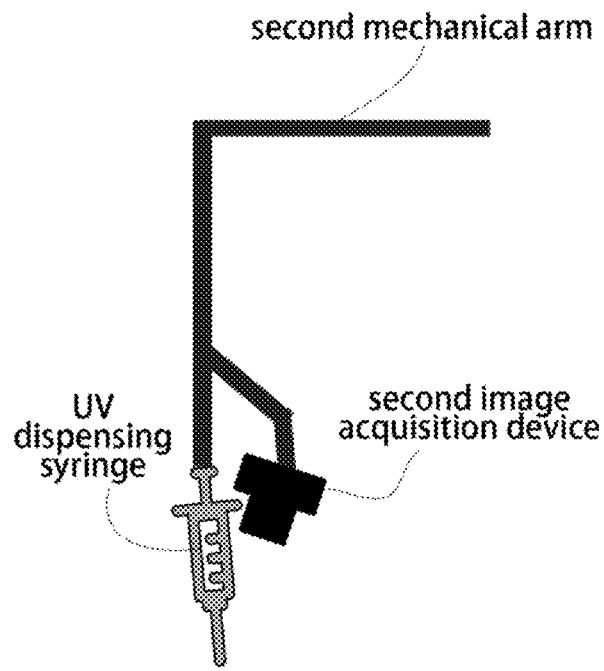
FIG. 4 is a schematic structural diagram of a dispensing mechanism 18 according to an embodiment of the disclosure.

In the present embodiment, as shown in FIG. 4, the dispensing mechanism 18 includes a second mechanical arm electrically connected to the controller, and a UV dispensing syringe fixed on the second mechanical arm. The second mechanical arm may drive the UV dispensing syringe to a specific dispensing position under the control of the controller 16, and the UV dispensing syringe performs the dispensing operation. Specifically, UV (Ultraviolet Rays) glue is stored in the UV dispensing syringe, which is a shadowless glue, also known as photosensitive glue or ultraviolet curing glue, which has high adhesion and rapid curing, which may indirectly improve the assembly efficiency of optical modules.

Optionally, as shown in FIG. 4, in order to ensure that the dispensing mechanism 18 may dispense at the correct position, a third image acquisition device is also fixed on the second mechanical arm. The third image acquisition device may capture an actual image of the optical member to be assembled before dispensing, and send the captured image to the controller 16. The controller 16 recognizes the received image, determines the dispensing position and sends a specific dispensing instruction to the dispensing mechanism 18.

Optionally, in the present embodiment, a UV lamp may be further provided on the alignment mechanism 12. The UV lamp is electrically connected to the controller 16, and may receive a curing instruction of the controller 16, and is turned on after the lens to be assembled is aligned, to accelerate the curing of UV glue and improve the assembly efficiency of optical module.

In an optional implementation manner, the power supply component 11 may supply power to the optical member to be assembled, so that make the optical module to be aligned image. Optionally, depending on the performance of the optical module, a light source device is provided in some of the optical members to be assembled, such as a semi-finished product of a micro-projection module. After the light source device is turned on, it may be imaged on the image side of the optical module.

It should be understood that, for an optical member to be assembled without a light source device, such as a semi-finished product of a camera module, to make such optical member to be assembled image, the optical module assembly device provided in the present embodiment further includes a light source device. Optionally, for the optical module to be aligned on the fixing member, the light source device is located on the object side of the optical module to be aligned, and parallel light may be generated to make the optical module to be aligned image. The light source device may be connected to the power source component, and its switching state may be controlled by the controller 16.

In the embodiment of the present disclosure, when the optical module is assembled, make the optical module to be aligned image, and a beam splitting prism and two sets of image acquisition device are used to obtain images imaged by the optical module to be aligned/or the images of the optical member to be assembled in two different directions respectively, and the controller may determine whether the lens to be assembled is aligned in all three axes according to the imaging results collected by the two sets of image acquisition device, and continuously control the alignment component to drive the lens to be assembled for position adjustment in the case of being not aligned. The above three-axis simultaneous feedback alignment process effectively reduces the assembly tolerance of the entire optical module, improves the assembly accuracy of the optical module, and effectively ensures the optical performance of the optical module.

It should be noted that the expressions herein of "first", "second", etc. are intended to distinguish between different messages, devices, modules, etc., and are not intended to represent a sequential order, nor is it intended to limit that "first" and "second" are of different types.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

The above is only the embodiment of the present disclosure and not intended to limit the present disclosure. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. An optical module assembling device, comprising:
 a fixing member for fixing an optical member to be assembled, a power supply component for supplying power to a light source of the optical member to be assembled, and an alignment mechanism for adjusting a position of a lens to be assembled relative to the optical member to be assembled;
 a beam splitting prism, wherein the beam splitting prism comprises one in-light surface, a first out-light surface and a second out-light surface, the in-light surface faces the optical member to be assembled and receives light transmitted from the light source of the optical member to be assembled, a first image acquisition device faces the first out-light surface of the beam splitting prism, is coaxial with the first out-light surface and receives light transmitted from the first out-light surface, and a second image acquisition device faces the second out-light surface of the beam splitting prism, is coaxial with the second out-light surface, and receives light transmitted from the second out-light surface; and
 a controller configured to control the alignment mechanism to adjust a position of the lens to be assembled according to the images captured by the first image acquisition device and the second image acquisition device;
 further comprising a dispensing mechanism;
 wherein the dispensing mechanism comprises a second mechanical arm electrically connected to the controller and a UV dispensing syringe fixed on the second mechanical arm;
 the dispensing mechanism is configured to perform a dispensing operation on the optical member to be assembled according to a dispensing instruction of the controller.

2. The assembly device according to claim 1, further comprising: a positive lens provided between the first image acquisition device and the beam splitting prism, and coaxial with the first image acquisition device.

3. The assembling device according to claim 2, wherein the positive lens comprises an aspheric positive lens.

4. The assembling device according to claim 1, wherein the beam splitting prism comprises two right-angle prisms bonded by oblique surfaces, and a bonding surface is plated with a semi-transmitted and semi-reflected dielectric film having a ratio between transmittance and a reflectance of 1:1.

5. The assembling device according to claim 1, wherein the dispensing mechanism further comprises a third image acquisition device fixed on the second mechanical arm.

6. The assembling device according to claim 1, wherein the alignment mechanism is provided with a UV lamp electrically connected to the controller.

7. The assembling device according to claim 1, wherein the alignment mechanism comprises:
 a first mechanical arm electrically connected to the controller, and an alignment head provided on the first mechanical arm; wherein the alignment head comprises a vacuum suction head or an adjustable mechanical clamping head.

8. The assembling device according to claim 7, wherein the alignment head further comprises an integration mechanism;
 the integration mechanism is connected to the first mechanical arm, and is configured to integrate a plurality of alignment heads on the first mechanical arm.

9. The assembling device according to claim 1, wherein each fixing member of a plurality of fixing members is provided with a sensor for detecting whether or not an optical member to be assembled is placed on the each fixing member.

10. The assembling device according to claim 2, wherein the alignment mechanism comprises:
 a first mechanical arm electrically connected to the controller, and an alignment head provided on the first mechanical arm; wherein the alignment head comprises a vacuum suction head or an adjustable mechanical clamping head.

11. The assembling device according to claim 3, wherein the alignment mechanism comprises:
 a first mechanical arm electrically connected to the controller, and an alignment head provided on the first mechanical arm; wherein the alignment head comprises a vacuum suction head or an adjustable mechanical clamping head.

12. The assembling device according to claim 4, wherein the alignment mechanism comprises:

a first mechanical arm electrically connected to the controller, and an alignment head provided on the first mechanical arm; wherein the alignment head comprises a vacuum suction head or an adjustable mechanical clamping head.

13. The assembling device according to claim 2, wherein each fixing member of a plurality of fixing members is provided with a sensor for detecting whether or not an optical member to be assembled is placed on the each fixing member.

14. The assembling device according to claim 3, wherein each fixing member of a plurality of fixing members is provided with a sensor for detecting whether or not an optical member to be assembled is placed on the each fixing member.

15. The assembling device according to claim 4, wherein each fixing member of a plurality of fixing members is provided with a sensor for detecting whether or not an optical member to be assembled is placed on the each fixing member.

* * * * *